United States Patent [19]

Feistel et al.

[11] 4,111,843

[45] Sep. 5, 1978

[54] SILICA-ALUMINA AND SILICA CATALYST SUPPORT BODIES

[75] Inventors: Gerald R. Feistel, Hinsdale; George N. Pessimisis, Berwyn, both of Ill.

[73] Assignee: Nalco Chemical Company, Oak Brook, Ill.

[21] Appl. No.: 794,689

[22] Filed: May 6, 1977

[51] Int. Cl.$^2$ .................... B01J 21/08; B01J 29/00; C01B 33/12
[52] U.S. Cl. .................................... 252/451; 423/339
[58] Field of Search .................... 252/451; 423/339

[56] References Cited

U.S. PATENT DOCUMENTS

| | | | |
|---|---|---|---|
| 2,071,987 | 2/1937 | Ridler | 252/451 X |
| 2,092,163 | 9/1937 | Johnson | 252/451 X |
| 2,097,634 | 11/1937 | Malan et al. | 252/451 |
| 2,176,851 | 10/1939 | Brewer et al. | 252/451 |
| 2,933,456 | 4/1960 | Braithwaite | 252/451 |
| 3,325,249 | 6/1967 | Burke, Jr. et al. | 423/339 |

*Primary Examiner*—Carl F. Dees
*Attorney, Agent, or Firm*—Kinzer, Plyer, Dorn & McEachran

[57] ABSTRACT

Porous silica particles useful in catalysis are prepared by adding excess alkali to a body of water glass; the excess alkali is responsible for increasing the pore diameter.

2 Claims, No Drawings

SILICA-ALUMINA AND SILICA CATALYST SUPPORT BODIES

REFERENCE TO A RELATED APPLICATION

This application contains a disclosure related to application Ser. No. 623,825, filed Oct. 20, 1975, now U.S. Pat. No. 4,039,474

According to U.S. Pat. No. 2,933,456 a silica-alumina complex useful in catalysis is prepared in the following manner:

1. silica in hydrous form is precipitated by adding a mineral acid (sulfuric or hydrochloric) to a body of water glass, $Na_2O\ (SiO_2)_{3.2}$, pH 8 to 10.5;
2. adding to the resultant slurry (silicic acid gel) an acidic aqueous solution of an aluminum salt such as aluminum sulfate or aluminum chloride having aluminum in the cation portion, lowering the pH to 2 or 3, to precipitate alumina in hydrous form on to the silica;
3. whereafter an aqueous solution of an aluminum salt in which aluminum exists in the anion (sodium aluminate or potassium aluminate) is added to the silica-alumina slurry to partially neutralize the acidity produced by the first aluminum salt, preferably at a pH of about 5, which impregnates the silica gel with alumina precipitated from both aluminum salts;
4. the resultant slurry containing silica impregnated with alumina is filtered to remove free moisture and the filter cake is spray dried to obtain the catalyst carrier in powder form which may be reslurried and refiltered to remove soluble salts.

In summary: in the known process of U.S. Pat. No. 2,933,456 silica alumina catalyst is obtained by precipitating silica in hydrous form from aqueous sodium silicate by means of a mineral acid and subsequently impregnating the silica gel with alumina precipitated in hydrous form by successive additions, first, of a water soluble aluminum salt containing aluminum in the cation only and, second, a water soluble aluminum salt in which aluminum exists in the anion. Most likely there is co-precipitation of silica and alumina during aluminum addition. After successive filtering and spray drying steps the final purified product is a powder where the silica content is 55 to 95% by weight (dry basis) and alumina the balance. The amount of aluminum sulfate (alum) determines whether the product is high or low in alumina.

The particles are microspherical, inherently porous and susceptible to impregnation with metallic catalyst precursors such as compounds of molybdenum, cobalt, nickel, tungsten, or mixtures thereof. Some reactions to be catalyzed take place on the surface of the particles and some reactions are promoted by diffusion into the catalyst support particles. In the first case, the pores are permissably (and preferably) small so as to confine the catalyst to the surface of the particles. In the second case the pores should be larger to assure penetration of the catalyst into the carrier. These are general cases; there are exceptions.

The commercial product under U.S. Pat. No. 2,933,456 is represented by microspherical particles obtained by spray drying. The microspheres may be of 50 micron diameter, employed in a fluidized bed where the particles are subjected to a great deal of contact one against another, both impact and sliding, resulting in fine subdivisions (as small as say 10 micron diameter) which can clog the catalytic reactor. The catalyst bed itself shifts, resulting in a grinding action which is also productive of fractured particles.

In some catalytic processes, particles of larger size and of considerable strength are required. Such sizes could be obtained by extrusion, resulting in pellets composed of numerous microspheres. However, extrusion has not been possible on an economic basis principally because the material undergoes wall slippage, that is, the bulk to be extrudable must be wet and being wet it slips so much inside the chamber behind the extrusion nozzle, where the force is applied, that only slow, uneconomic rates can be achieved, and even then the pellets are not strong.

Extrudability of microporous silica-alumina catalyst carriers of exceptional strength can be achieved in a practical production sense by following the process of the patent except that the starting body of water glass, $Na_2O\ (SiO_2)_{3.2}$, is infused with excess alkali. Excess alkali is preferably in the form of caustic (NaOH) or sodium carbonate, $Na_2CO_3$. By employing excess alkali, the resultant particles are opaque and more soft compared to the clear, hard, glass-like particles obtained under U.S. Pat. No. 2,933,456 where excess alkali does not exist.

Excess alkali means more than is present in water glass. In water glass the amount of alkali is precisely as reported in U.S. Pat. No. 2,933,456, namely, in the weight proportion of $Na_2O\ (SiO_2)_{3.27}$, that is 1:3.27. In orthosilicate, for comparison the mole ratio is $2Na_2O$:$SiO_2$ and in meta silicate the mole ratio of alkali to silica is 1:1.

Under Example 1 below excess alkali is obtained by adding NaOH to "plant" sodium silicate which is water glass.

EXAMPLE 1

6,720 mls of aqueous sodium silicate containing excess alkali were prepared by digesting 3,160 mls plant sodium silicate in 3,560 mls of 50% NaOH at 170° F for 15 minutes, and added to a tank containing 10.8 gallons water (90° F). Then 4,920 mls of plant sodium silicate, water glass (9.1% $Na_2O$, 28.8% $SiO_2$), were added and the solution was heated to 120° F. To the above solution, 10,930 mls of 35% $H_2SO_4$ were added with agitation over a period of 50 minutes to pH 8.3. To the above precipitated silica gel, 6,420 mls of plant concentrated alum (25% aqueous solution) were added over a period of 17 minutes. The mixture then was adjusted to pH 5.5 with 11,292 mls of diluted sodium aluminate (SA) solution (1,830 mls of plant SA diluted in 9,462 mls $H_2O$). The diluted SA solution was added over a period of 20 minutes. The final batch slurry temperature was 108° F.

The batch slurry was filtered in buchner funnels. The filter cake was reslurried in 10 pounds of diethylene glycol and was spray dried. The dried product was washed with water and with a dilute $NH_4OH$ to remove the soluble salts. The purified filter cake was oven dried at 150° F for 16 hours. The dried product was adjusted with water to 62% FM (free moisture) using a Simpson muller. The wet material was mulled for 20 minutes and was extruded. Extrusion was very good. The extrudates were calcined at 1100° F for 3 hours. Data on crush strength and pore distribution are shown in Table I for the 5/64 inch size. The "free moisture" is calculated as the percent weight loss by heating a sample of the mulled or extruded material on a Model 6000 OHAUS Moisture Determination Balance for 20 minutes at a heater setting of 75°.

EXAMPLE 2

The same formulation and procedure were used in preparing this catalyst as in Example 1 with the exception the amounts of alum and sodium aluminate were increased slightly to obtain 31% $Al_2O_3$ on the catalyst. The material was extruded at 64.5% FM. Extrusion was very good. Data are given in Table I.

EXAMPLE 3

To increase the density, the same formulation and procedure were used as in Example 2 with the following exceptions, (a) the sodium silicate containing excess alkali was prepared in 16 gallons $H_2O$ and (b) only 0.1 pound of diethylene glycol was used instead of 1.0 pound per pound of catalyst. Extrusion was very good. Data are given in Table I.

EXAMPLE 4

This sample is a repeat of Example 2 with the exception that the material was extruded at 63% FM instead of 64.5%. Data are given in Table I.

EXAMPLE 5

A repeated preparation of Example 2 except the purified spray dried product was calcined at 1050° F for 3 hours and prepared in powdered form rather than extruded. Data are given in Table I.

EXAMPLE 6

This example was prepared by the method of Example 1 herein but using no excess alkali thus conforming to Example 1 of U.S. Pat. No. 2,933,456. The product could not be extruded to give a material of useable crush strength. This example also illustrates the amount of pores below 100A° which are generally not affected by extrusion, which is to say that while the product of Example 6 was not extruded the pore volume below 100A° may be validly compared to the corresponding pore volume of the extrudates set forth in Table I.

TABLE I

| Example | Extruded Diameter | Crush Strength (pounds) | Pore Volume (PV) Less Than 1200A Diameter (1) | 1200-100A (PV) | 0-100A (PV) |
|---|---|---|---|---|---|
| 1 | 5/64 | 9.5 | | | |
| 2 | 5/64 | 9.1 | 1.15 | 0.98 | 0.17 |
| 3 | 5/64 | 11.2 | 0.87 | 0.71 | 0.16 |
| 4 | 5/64 | 8.5 | 0.93 | 0.78 | 0.15 |
| 5 | | | 1.46 | 1.33 | 0.13 |
| 6 | | | 0.65 | 0.30 | 0.35 |

Diethylene glycol is only an aid to extrusion. It has no appreciable effect on strength or pore volume distribution. Each of Examples 2 through 5 was of high alumina content (approximately 31% by weight). Example 6 had the same alumina content for comparison.

It will be seen from Table I that extrudates with good crush strength are realized. Crush strength is tested simply by applying an increasing force until the pellet fails in compression.

It is believed the advantageous result is because the excess alkali generates softer catalyst particles more capable of conforming to the extrusion orifices. However, a completely unexpected result is the shift in pore volume distribution. Thus, in comparing Example 6, Table I, to the others, excess alkalinity results in nearly a fifty percent decrease of pore volume below 100A°, that is, the known catalyst of Example 6 had considerably more pore volume in the smaller diameter.

That increased alkalinity (deemed $Na_2O$) is responsible for the shift in pore volume is corroborated by sodium carbonate ($Na_2CO_3$) accomplishing the same thing, as shown by the following examples.

EXAMPLE 7

A catalyst was prepared using water glass in accordance with Example 1 of U.S. Pat. No. 2,933,456, without excess $Na_2O$. This catalyst was low in alumina, approximately 13% by weight. It was not possible to extrude this catalyst. This example is included as a pore distribution comparison catalyst.

EXAMPLE 8

This catalyst was a repeat of Example 7 except sodium carbonate ($Na_2CO_3$) was added to the body of water glass at the inception in the proportion of 0.32 pounds of $Na_2CO_3$ per pound of final catalyst.

EXAMPLE 9

This catalyst was a repeat of Example 8 except the amount of $Na_2CO_3$ was reduced to 0.16 pounds per pound of final catalyst.

TABLE II

| Example | PV Less Than 1200A | PV 100A or Less |
|---|---|---|
| 7 | 0.69 | 0.47 |
| 8 | 1.10 | 0.19 |
| 9 | 0.98 | 0.27 |

The catalyst prepared without excess alkali (Example 7) had nearly 68% of the pore volume in the 100A° size or less, compared to only 17% for Example 8 and 27.5% for Example 9. Examples 8 and 9 show that as the proportion of excess alkali increases the greater the pore volume in the larger diameter. The amount of excess alkali in Example 8 is deemed of unit value and by that token the amount of excess alkali under Example 9 is one-half unit. In other words, the greater the proportion of alkali in excess of that required to form water glass, the greater the pore diameter, The preferred example is Example 1 where the amount of sodium hydroxide (calculated as pure NaOH) is 0.55 pounds per pound of dry, finished catalyst obtained after extrusion and calcining. On a mole basis the excess alkali (derived from NaOH) is 2.04 moles $Na_2O$ per mole of water glass. The excess alkali is simply that required to render the oven-dried, purified filter cake extrudable (on a commercial scale) in the presence of free moisture; or viewed another way the excess over that required to form water glass is an amount sufficient to produce pores of an appreciably larger diameter compared to the pore size distribution when the body of sodium silicate is in water glass proportion.

It has been further found the phenomonon of varying pore size, in the manner disclosed above, is equally applicable to silica particles per se precipitated from a sodium silicate solution with acid; also, a variation in temperature will alter the pore size.

The acid neutralizes the sodium ions and causes silica to precipitate as a hydrogel.

In the experimental work with silica, the pore volume was varied from 0.82cc/gram to 1.53cc/gram and the average pore diameter was varied from 63A° to 189A°.

EXAMPLE 10 (Experiment 1991)

| Basic Formulation, Solution A | Pounds | Pounds SiO$_2$ |
|---|---|---|
| 29.1 gallons H$_2$O | 243 | |
| 5.75 gallons (sodium silicate) | 67 | 19.2 |
| Na$_2$CO$_3$ (variable) | | |
| Solution B, 35% H$_2$SO$_4$ | | |
| 2.16 gallons H$_2$O | 18 | |
| 0.65 gallons | | |
| 98% H$_2$SO$_4$ | 10 | |
| Total Batch | 338 | 19.2 |
| % Solids Total Batch $\frac{19.2}{338} \times 100 = 5.68\%$ | | |
| % Solids, A-solution $= \frac{19.2}{310} \times 100 = 6.2\%$ | | |

5.75 gallons of sodium silicate containing 28.6% SiO$_2$ and 9.1% Na$_2$O was added to 29.1 gallons of water. This diluted sodium silicate solution was heated to 116° F and is designated as solution "A". To this solution was added, with agitation, 2.81 gallons of 35% H$_2$SO$_4$ (solution "B") in 60 minutes to pH 3.8. The silica started to gel after 38 minutes of acid addition.

The precipitated silica gel was aged over a period of 1 hour at 117° F. The pH was 5.4 after aging.

The slurry was filtered on a vacuum rotary filter, the cake was reslurried with water to a pumpable mixture and was spray dried. The product was purified with water to remove the soluble salts; it was oven dried for 3 hours at 300° F and then was calcined at 840° F for 4 hours.

The calcined silica xerogel was evaluated for chemical and physical properties. The results are shown in Table II.

The electrolyte (Na$_2$CO$_3$) was added to the diluted sodium silicate solution before acid addition. Using the above basic formulation and procedure we evaluated the variables of temperature and concentration of Na$_2$CO$_3$ (source of excess alkali) as effecting average pore diameter (APD) and pore volume (PV, in cc/gram).

TABLE III

| Experiment No. | % Solids (A-Solution) | #Na$_2$CO$_3$ #SiO$_2$ | Temp. °F(1) | pH | Gelation Time (mins.) |
|---|---|---|---|---|---|
| 1991 | 6.2 | None | 116 | 5.4 | 38 |
| 2012 | 6.2 | None | 130 | 3.9 | 35 |
| 2031 | 6.2 | 0.15 | 130 | 3.5 | 25 |
| 2051 | 6.2 | 0.075 | 130 | 3.5 | 34 |
| 2081 | 6.2 | 0.15 | 131 | 3.2 | 27 |

| | ABD(2) | PV(3) | PD$_{av.}$ A | PVD(4) 1200-100A | 100A and less |
|---|---|---|---|---|---|
| 1991 | 0.448 | 0.82 | 62.9 | 0.18 | 0.63 |
| 2012 | 0.390 | 1.0 | 67.3 | 0.33 | 0.61 |
| 2031 | 0.284 | 1.16 | 87.4 | 0.76 | 0.35 |
| 2051 | 0.315 | 1.09 | 78.8 | 0.61 | 0.44 |
| 2081 | 0.304 | 1.055 | 83.2 | 0.69 | 0.40 |

(1)Precipitation Temperature
(2)Average bulk density
(3)Pore volume in cc/gram; determined by water absorption
(4)Pore volume distribution by nitrogen absorption; rounded off to two decimal places It will be seen from the data in Table III that as excess alkali increases progressively from zero to 0.15 pounds per pound SiO$_2$, the average pore diameter (PD$_{av.}$) increases from 62.9A° to 83.2A°, the density decreases, pore volume increases and the pore volume distribution is altered so that there is a greater proportion in the larger diameter.

Also, the same progression prevails with an increase in precipitation temperature.

EXAMPLE 11 (Experiment 2121)

| Basic Formulation, Solution A | Pounds | Pounds SiO$_2$ |
|---|---|---|
| 29.1 gallons H$_2$O | 243 | |
| 8.625 gallons (sodium silicate) | 101 | 28.8 |
| 5.0 pounds Na$_2$CO$_3$H$_2$O | | |
| (4.275# Na$_2$CO$_3$) | 5 | |
| Solution B | | |
| 5.1 gallons H$_2$O | 42.5 | |
| 1.26 gallons 98% H$_2$SO$_4$ | 19.5 | |
| Total Batch | 411 | 28.8 |
| % Solids Total batch $\frac{28.8}{411} \times 100 = 7$ | | |
| % Solids, A-solution $\frac{28.8}{349} \times 100 = 8.3$ | | |

8.625 gallons of sodium silicate (28.6% SiO$_2$ and 9.1% Na$_2$O was added to 29.1 gallons water containing 4.275 pounds of Na$_2$CO$_3$. This is solution "A" which was heated to 130° F under agitation.

62 pounds (6.36 gallon) of 31% by weight of H$_2$SO$_4$ was added to the above "A" solution over a period of 56 minutes to pH 5.4. The silica started to gel after 26 minutes of acid addition. The final batch temperature was 136° F. The batch was aged for 1 hour and after aging the temperature was 123° F and the pH was 5.7.

The precipitated silicic acid gel was filtered and the filter cake solids were 17%. The spray dried product was processed as in Example 10.

Using the above basic formulation and procedure, we investigated the effect of variables of temperature and concentration with the results shown in Table IV:

TABLE IV

| Experiment No. | % Solids (A-solution) | #Na$_2$CO$_3$ #SiO$_2$ | Temp. °F | pH | Gelation Time |
|---|---|---|---|---|---|
| 2121 | 8.3 | 0.15 | 130 | 5.4 | 26 |
| 2141 | 8.3 | 0.11 | 110 | 5.7 | 21 |
| 2171 | 8.3 | 0.075 | 110 | 5.4 | 24 |

| | | | | PVD | | |
|---|---|---|---|---|---|---|
| | ABD | PV | PD$_{av.}$ | 1200A | 100A | and less |
| 2121 | 0.220 | 1.46 | 159.9 | (−100) | 1.37 | 0.16 |
| 2141 | 0.315 | 1.27 | 127.1 | 1.26 | 1.04 | 0.22 |
| 2171 | 0.362 | 1.10 | 113.7 | 1.05 | 0.81 | 0.23 |

The results confirm those presented under Example 10.

As in the instance of forming silica-alumina particles the source of excess alkali is preferably Na$_2$CO$_3$ (but may be NaOH) and again the excess alkali is understood as Na$_2$O in excess of the stoichiometric amount in water glass expressed as Na$_2$O(SiO$_2$)$_{3.2}$. Referring to Table III, no excess alkali was involved with experiment Nos. 1991 and 2012, evidencing that the temperature change alone was responsible: as the temperature of precipitation increases, there is a shift to the larger pore diameter and the same pheonomonon is observed in the instance of precipitating the silica-alumina particles. Again referring to Table III, the first two experiments involve no excess alkalinity; experiment Nos. 2031 and 2081 may be viewed as each involving one unit of excess alkalinity whilst experiment No. 2051 involved one-half unit.

In the instance of the silica particles, extrudates were not made; here, the catalyst (a soluble metal compound) may be used to impregnate the pore per se as the carrier.

We claim:

1. In a process where porous microspherical, microporous silica particles useful in catalysts are prepared by adding a mineral acid to a body of aqueous sodium silicate starting material to precipitate silica in hydrous form, after which the product is filtered, purified and dried: the improvement characterized by said body of aqueous sodium silicate starting material, before acid is added, being treated with $Na_2O$ so that the alkali expressed as $Na_2O$ in the starting material is substantially in excess of that required to form water glass and in an amount sufficient to produce micro pores of an appreciably larger diameter compared to pore size distribution when the body of sodium silicate is in water glass proportion without excess alkali.

2. A process according to claim 1 in which excess alkalinity is achieved by addition of sodium hydroxide or sodium carbonate to water glass.

* * * * *